United States Patent [19]

Delphin et al.

[11] Patent Number: 4,839,114
[45] Date of Patent: Jun. 13, 1989

[54] METHOD OF MANUFACTURING AN ELECTRICALLY CONDUCTIVE THERMOPLASTIC MATERIAL

[75] Inventors: René Delphin, Fontenay aux Roses; Bernard Regnaut, Antony, both of France

[73] Assignee: Occidental Chemical Corporation, Conn.

[21] Appl. No.: 810,122

[22] Filed: Dec. 18, 1985

[30] Foreign Application Priority Data

Dec. 18, 1984 [FR] France ................................ 8419359

[51] Int. Cl.$^4$ ...................... B29C 47/92; B29C 47/50; B29C 47/76; C08K 3/04
[52] U.S. Cl. .................... 264/40.4; 252/511; 264/102; 264/105; 264/177.2; 366/75
[58] Field of Search ................. 264/41, 141, 105, 104, 264/177.2, 40.4, 202; 252/511; 366/75

[56] References Cited

U.S. PATENT DOCUMENTS

| | | | |
|---|---|---|---|
| 3,060,512 | 10/1962 | Martin et al. | 264/41 X |
| 3,733,385 | 5/1973 | Reddish | 264/105 |
| 3,846,223 | 11/1974 | Lederman et al. | 264/105 X |
| 4,107,787 | 8/1978 | Ocker | 264/102 X |
| 4,124,747 | 11/1978 | Murer et al. | 428/220 X |
| 4,350,652 | 9/1982 | Theysohn et al. | 264/105 X |
| 4,465,616 | 8/1984 | Nelson et al. | 264/105 X |
| 4,474,685 | 10/1984 | Annis | 264/105 X |
| 4,758,473 | 7/1988 | Herscovici et al. | 264/105 X |
| 4,778,636 | 10/1988 | Krieg et al. | 264/105 |

FOREIGN PATENT DOCUMENTS 0016662 10/1980 European Pat. Off. .
0123540 10/1984 European Pat. Off. .

Primary Examiner—Philip Anderson
Attorney, Agent, or Firm—Sughrue, Mion, Zinn, Macpeak & Seas

[57] ABSTRACT

A method of manufacturing a highly electrically conductive plastic material from thermoplastic resin and carbon fill through a two-screw mixer having a screw length of more than twenty times the screw diameter involves continuously inserting a thermoplastic resin into a first zone of the two-screw mixer and compacting and preheating the thermoplastic resin. The resin is then passed into a second zone where it is kneaded and plastified. A particulate carbon fill is continuously inserted into a third zone with the fill constituting 30 to 50% by weight of the mixture and being dispersed in said resin within the third zone. The speed of rotation of the two screw mixer lies in the range between 150 to 250 RPM and the temperatures of the zones lie within the range of 165° C. to 300° C. After passage through the various zones, the mixture is removed via an outlet of an extrusion head. A copolymer propylene and ethylene forms the thermoplastic resin in the carbon black and the carbon black constitutes the particular carbon fill. A fill of not more than 10% by weight carbon fibers may be inserted at one of the zones. Further, a fourth zone may follow the third zone with the method further including the step of degasing the mixture at a pressure lying in the range of atmospheric pressure to a few millibars at the fourth zone.

4 Claims, 3 Drawing Sheets

METHOD OF MANUFACTURING AN ELECTRICALLY CONDUCTIVE THERMOPLASTIC MATERIAL

The present invention relates to a method of manufacturing a highly electrically conductive thermoplastic material usable, for example in conductive seals, in bipolar elements for fuel cells, in other electrochemical devices, etc.

Such a material must present several characteristics simultaneously:

electrical resistivity which is as low as possible and in the range a few ohm-centimeters to a few tenths of an ohm-centimeter, for example;

good uniformity of composition and of electrical and mechanical characteristics in particular;

the absence of additives which are harmful to catalysts that may be used in the electrochemical devices concerned;

sufficient chemical inertness relative to the fluids flowing through such electrochemical devices at their operating temperatures;

very low cost price;

suitability for cheap industrial fabrication by the operations of: extrusion, calendering, hot pressing, injection, etc. for mass producing parts having the general shape of large surface area thin plates: thickness of about one millimeter; surface area of several tens of square decimeters up to one square meter;

mechanical characteristics such that the plates made in this way with this material are not fragile and have sufficient bending strength when hot and when cold to be compatible with the assembly methods used for electrochemical and other devices in which they may constitute component parts;

adequate sealing properties at the above-mentioned thicknesses relative both to gases and to liquids; and long-term stability of these characteristics compatible with the intended use.

It is possible to obtain a material which has suitable resistivity by incorporating a metal fill in a thermoplastic material. However, the cost of such a material is very high and in addition the metal fill cannot be chemically inert relative to the surrounding medium. It is thus more advantageous for these reasons to use carbon fills, which are much less expensive and which are generally less reactive.

Numerous electrically conductive thermoplastic materials containing carbon fills have already been made, and sometimes they have even been sold, as can be seen from the following articles:

Electrical Conduction Mechanism in carbon filled polymers (IEEE Transactions May/june 1971; pages 913 to 916);

Modern Plastics International: March 1976; pages 45 to 47;

JEE: November 1978; pages 42 to 45;

Modern Plastics International: August 1983; pages 38 to 40;

Research and Development: May 1984; pages 118 to 123;

Adhesive Age: June 1984; pages 17 to 20.

None of the materials described in these articles has all of the above-mentioned characteristics.

Table I below summarizes the electrical resistivity of currently known commercially available materials, together with a few details concerning their manufacture, their degree of carbon filling, and their melt flow index which determines whether they are suitable for cheaply manufacturing thin parts of large surface area.

TABLE I

| REFERENCE | METHOD Type of machine | RESIS- TIVITY (Ωcm) | CONCEN- TRATION (%) | MELT INDEX (g/10 mn) |
|---|---|---|---|---|
| DARLING Co. | Open mixer | 25.4 | 64 | |
| DARLING Co. | " | 7.6 | 70 | |
| DARLING Co. | " | 5.1 | 76 | |
| Esso Research | | 57 | 39 (1) | |
| Esso Research | | 17 | 32 (1) | |
| LNP | | 5 to 20 | 40 (2) | |
| UNIROYAL (TPR) | | 150 | | |
| CAPREZ | | 9.3 | 30 | 14.4 at 230° and 21.6 kg |
| CAPREZ CP | | 6 | | 4.5 at 230° and 21.6 kg |
| ABBEY 100 | | 8 | 45 | |
| DUPONT DE NEMOURS (NDX4769) | | 30 | | |
| TECKNIT 860 | | 10 | | |
| TECKNIT 861 | | 5 | | |
| CABELEC | | 0.7 | 50 | |
| CABELEC | | 0.9 | 47 | |

(1) Vulcan XC72 carbon black
(2) Carbon fibers

It can be see that the low electrical resistivity obtained by conventional methods (either using an open mixer or an internal, Banbury type mixer) are obtained at the price of a very high degree of carbon fill.

The materials obtained in this way are not usable for cheaply injecting thin parts of large surface area because they do not flow sufficiently when hot, or because the resulting objects are brittle.

U.S. Pat. No. 4 124 747 also describes a discontinuous method consisting in using a preheated Banbury type mixer to mix finely divided carbon into a propylene-ethylene thermoplastic copolymer, with there being about 30% carbon by weight. The preheat temperature is about 100° C.; mixing takes place for a duration of 3 to 5 minutes.

The thermoplastic material obtained in this way may be extruded in the form of sheets having a thickness in the range 150 microns to 500 microns and having a resistivity of a few ohm centimeters. However, it is practically impossible to use for obtaining thin parts of large surface area by injection because of the above-mentioned reasons.

Further, the applicant has performed a number of tests in order to improve this situation by using open or closed (Banbury type) mixers and also by prior mixing the two components in the powder state in an ultrafast mixer followed by plastification of the mixture in an extruding machine. The main results of these tests are summarized below in Table II.

TABLE II

| REFERENCE | METHOD Type of machine | RESIS- TIVITY (Ωcm) | CONCEN- TRATION (%) | MELT INDEX (g/10 min) |
|---|---|---|---|---|
| TEST No. 1 | Open mixer | 0.85 | 47 | |
| TEST No. 2 | Open mixer | 0.87 | 47 | |
| TEST No. 3 | Banbury | 0.43 | 47 | 0 to 230° and 21 kg |
| TEST No. 4 | Banbury | 0.80 | 47 | |
| TEST No. 5 | Banbury | 1 | 47 | 1 to 230° and 21.6 kg |

In conclusion, it appears that the various methods used up until now do not provide a material which is sufficiently electrically conductive without using concentrations of carbon which give rise to much too low a melt index to be able to inject thin parts of large surface area.

Preferred implementations of the present invention provide a method of manufacturing a conductive thermoplastic material whose resistivity is less than that of the earlier materials, i.e. is a few tenths of an ohm-centimeter, and whose fluidity when hot is sufficient for industrial application of the above-mentioned operations in order to obtain very thin conductive sheets which are not very fragile.

The present invention provides a method of continuously manufacturing a thermoplastic material comprising a mixture of thermoplastic resin and a carbon fill, characterized by the fact that a two-screw mixer is used, the screw length being more than twenty times the screw diameter, said thermoplastic resin being continuously inserted into a first zone of said two-screw mixer where it is compacted and preheated, the said resin then passing into a second zone of said two-screw mixer where it is kneaded and plastified, a particulate carbon fill being continuously introduced into a third zone of said two-screw mixer, the fill constituting 30% to 50% by weight of the mixture and being dispersed in said third zone, the speed of rotation of said two-screw mixer lying in the range 150 to 250 rpm, the temperatures of said zones lying in the range between 165° C. to 300° C., and the said mixture then being removed via the outlet from an extrusion head.

The carbon fill preferably consitutes 35% to 45% by weight of the mixture.

Preferably, a fill of carbon fibers is also introduced into the mixture either together with the fill of particles or at another moment, the total quantity of carbon fiber fill not exceeding 10% by weight of the mixture.

Advantageously, the two-screw mixer includes a fourth zone following said third zone and intended to degas said mixture at a pressure lying between atmospheric pressure and a few millibars.

In an entirely unexpected manner, a material is obtained whose electrical and mechanical characteristics are most remarkable for a carbon particle fill: the electrical resistivity is an order of magnitude less than that obtained for a material of the same composition made by conventional methods, and the mechanical characteristics of thin plates of large area obtained therefrom, for example, are considerably improved.

Also unexpectedly, the electrical conductivity of the above material is further improved by a factor of several times if the carbon particle fill includes a few percent of a carbon fiber fill.

The thermoplastic resin may be a copolymer of ethylene and propylene, and the carbon fill may be selected from various types of carbon black. The carbon fill should be highly conductive and as cheap as possible while still being easy to incorporate in the resin. The lower the density of the fill, the easier it is to disperse, but the more difficult it turns out to incorporate in the resin. A compromise has to be achieved between a low fill ratio using finely divided carbon black and a higher fill ratio using a denser carbon black which is easier to incorporate.

The above-mentioned results are easily obtained if the continuous feeds of thermoplastic resin and carbon fill are therefore performed by means of weighing dispensers capable of ensuring that the raw material feed rates do not depart from their nominal settings by more than ±1%.

An implementation of the method in accordance with the invention is described below by way of example with reference to the accompanying drawings, in which.

Figure 1:
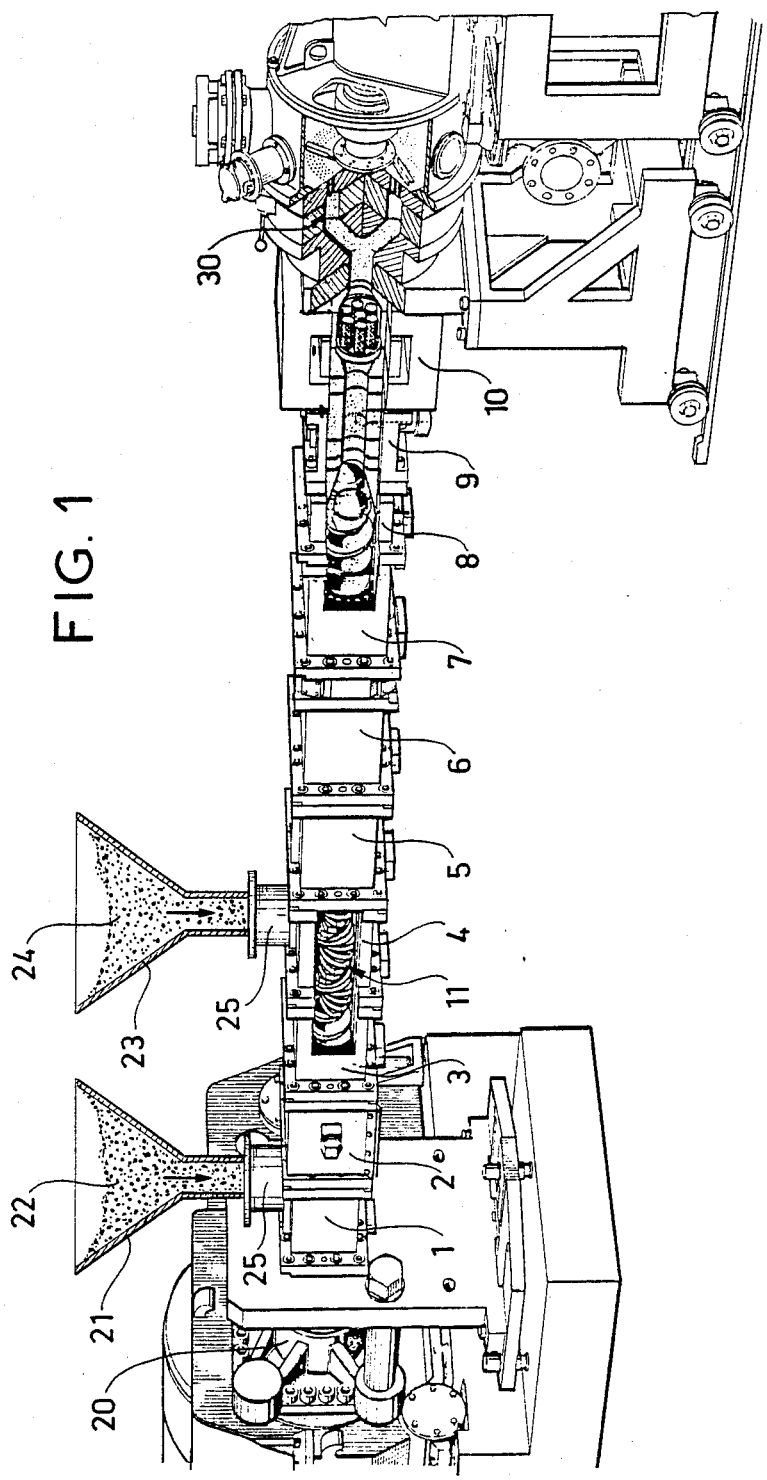
FIG. 1 is a diagrammatic view of apparatus for performing the method of the invention.

FIG. 1 shows very diagrammatically a mixer 11 suitable for manufacturing material in accordance with the invention. The mixer is a two-screw type mixer as sold under the trademark Werner und Pfleiderer, with a screw length which is more than twenty times the screw diameter. By way of example, the mixer may be a ZSK 30 or a ZSK 57 type mixer which respectively have diameters of 30 mm and 57 mm.

The two screws are encased in a series of ovens referenced 1 to 10 which are regulated, as is explained below, to temperatures in the range 165° C. to 300° C. The screws are driven by a motor which is diagrammatically represented by a box 20, and its speed of rotation lies in the range 150 rpm to 250 rpm.

A copolymer of propylene and ethylene 22 is accurately measured out to within ±1% by a weighing dispenser 21 and is introduced via a funnel 25 into a first zone of the two screws encased by the oven 1. At this stage the resin is compacted and preheated, but any gelification must be avoided. In succeeding ovens 2 and 3, the mixing and kneading continues and the resin is plastified, with the oven 20 being adjusted to 220° C. and the oven 3 to 295° C. The oven 4 is likewise adjusted to 295° C. and the carbon fill which is constituted by carbon black is introduced at this point. The fill is accurately measured by a weighing dispenser 23. Carbon black 24 is thus inserted into the resin and is dispersed therein.

In order to obtain a uniform conductivity and melt index in the product, it is essential for the degree of carbon fill to be uniform and accurate. The product must be uniformly conductive and must have a uniform melt index in order to be capable of rapid injection since this process requires raw materials having highly uniform characteristics.

As already mentioned, no other technique for manufacturing conductive mixtures enables the following desirable characteristics to be obtained simultaneously: the conductive fill is thoroughly dispersed to a uniform concentration, thereby achieving high and uniform electrical conductivity; the hot melt index is satisfactory and constant and compatible with the implementation of the intended application.

Mixing and dispersal continue along the two screws through ovens 5 to 10, with the oven 5 being adjusted to 295° C. and ovens 6 to 10 being adjusted to 200° C. The mixture is degased at oven 9 which may be maintained at a pressure of 55 mBar, for example.

The resulting mixture passes through an extrusion head 30 which is adjusted to a temperature of about 250° C. Extrusion takes place through a die having ten holes each having a diameter of a few millimeters, with the material and the outlet from the die being at a temperature of about 270° C. The rods made in this manner are passed through a trough of water and are then inserted into a granulator.

Material may be obtained at a rate of about 55 kg per hour when the two screws are rotated at 250 revolutions per minute (rpm).

Figure 2:
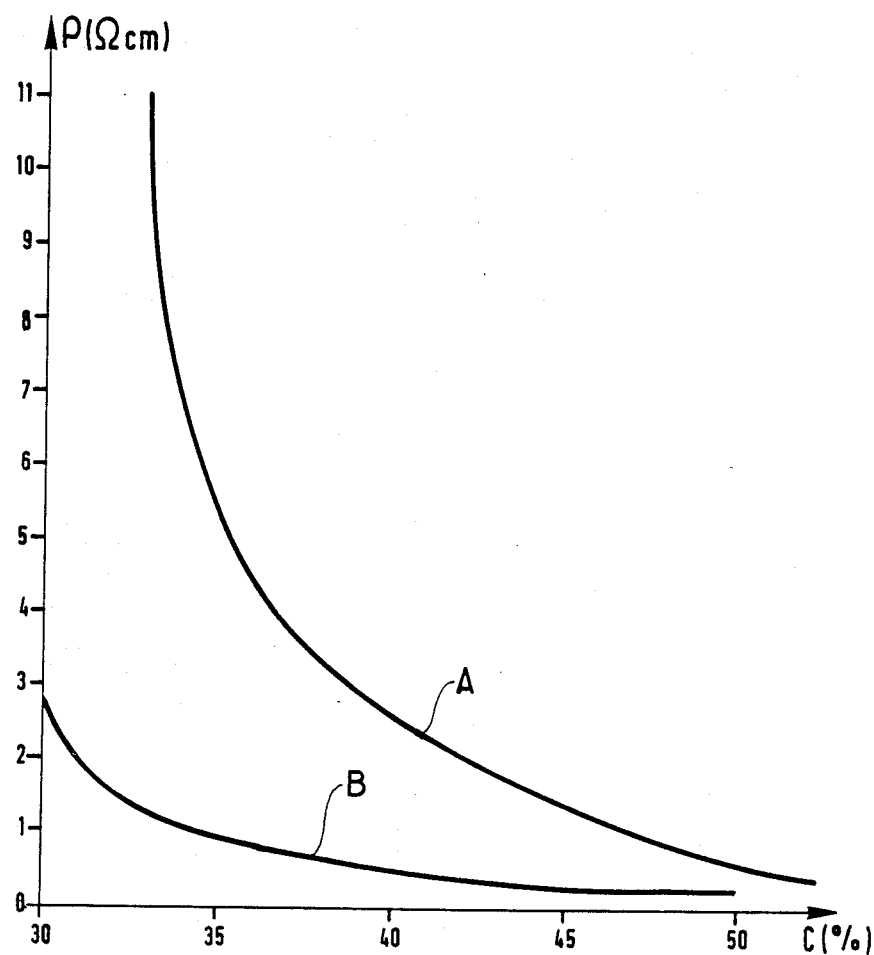
FIG. 2 is a graph showing the variation in resistivity $\rho$ ($\Omega$cm) as a function of the concentration C% of carbon black for a material manufactured in accordance with the prior art (curve A), and for a material manufactured in accordance with the method of the present invention (curve B)

FIG. 2 shows the surprising electrical characteristics of the material obtained by the method in accordance with the invention in comparison with the electrical characteristics of commercially available materials and of the material produced by the prior art discontinuous Banbury method. In all cases, the mixture is based on the same materials. The carbon black is Vulcan XC 72 black sold under the trademark Cabot. Curve A shows the value of the resistivity of the prior art material and curve B shows the resistivity of material in accordance with the invention. Thus, for a carbon black concentration of about 35%, the resistivity of the prior art material is 6 $\Omega$cm, whereas the resistivity of the mixture in accordance with the invention is only 0.85 lcm. A prior art material of the same resistivity can be obtained, but this requires a carbon black concentration of about 50%. Such a mixture is so viscous that it is unusable in an injection process. Further, thin plates made from such material by a hot pressing technique would be very fragile.

Figure 3:
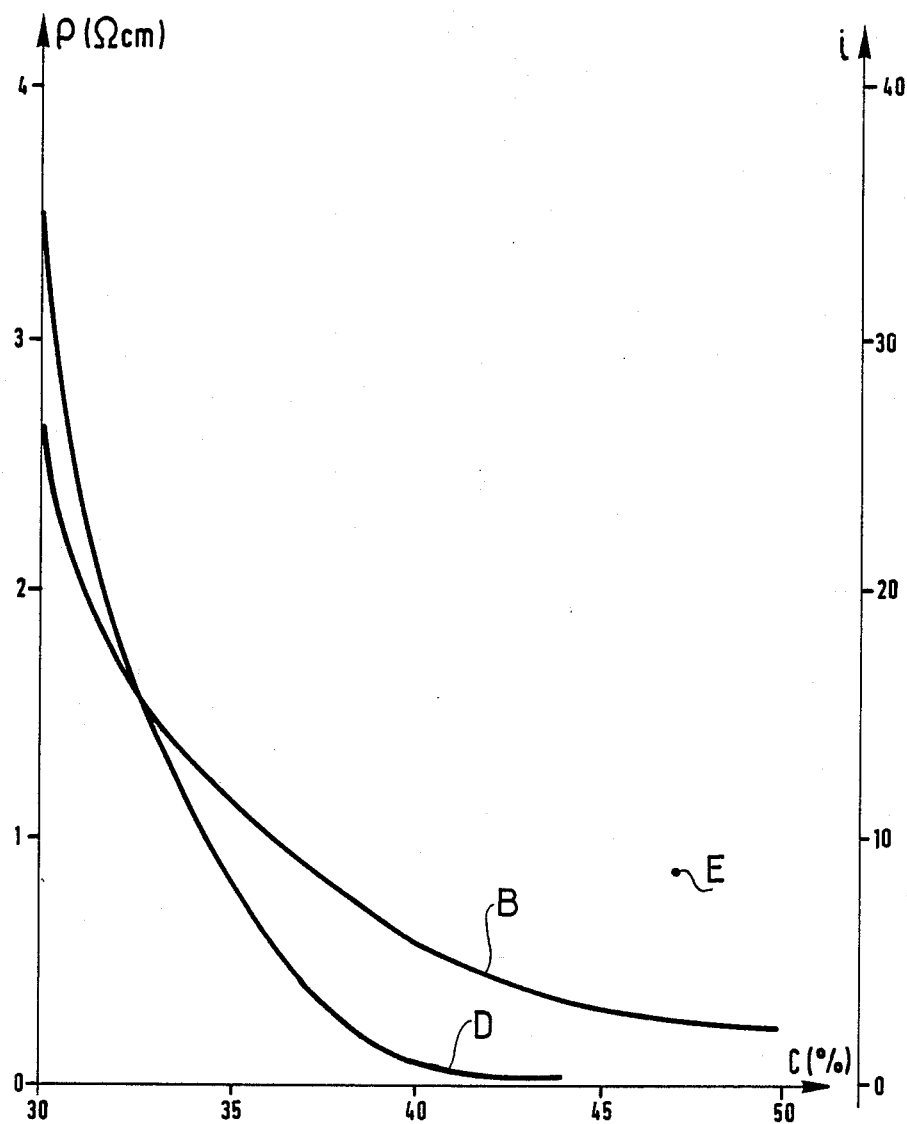
FIG. 3 is a graph to a larger scale showing a portion of the FIG. 2 graph, together with a curve (D) showing the variation of the melt index of the material obtained by the method of the invention as a function of the concentration of carbon black C%.

Turning to FIG. 3, a portion of the FIG. 2 curve B is reproduced on a larger scale, together with a curve D showing the melt index (i) as a function of the concentration C(%) of carbon black.

Point E represents the resistivity of a prior art mixture at a very high concentration of 47% carbon together with a hot melt index which is incompatible with making thin conductive parts of large surface area by injection.

Vulcan carbon black may be replaced by other particulate carbon fills. Thus, Ketjen black sold under the trademark Akzo can be used with the same method to achieve the same resistivity as with Vulcan, but with a concentration of 25% instead of 38%.

The completely surprising results obtained by implementing the method of the invention make it possible to inject products of the bipolar element type for a fuel cell using mass production machinery.

In addition to their high conductivity, these elements possess numerous other qualities, in particular:

hardness: 60 to 70 on the Shore scale;

flexibility: an element having the thickness of 1.5 mm may be bent without damage into a circular arc having a diameter of 150 mm;

tensile strength: the same element may be subjected to an ultimate tensile stress of 0.5 da N/mm$^2$ to 3.5 da N/mm$^2$ for an elongation of 4% to 7.5%; and the material is thermally and chemically inert.

In accordance with an improvement of the method in accordance with the invention, the above-described mixture which already contains 38% Vulcan XC 72 carbon black had various carbon fiber fills added thereto at rates of 3% to 9% by weight. It was observed in a surprising manner that the electrical conductivity was multiplied thereby by a factor of 3 to 6.

Naturally, the invention is not limited to the implementation which has been described, in particular concerning the type of two-screw mixer, the temperatures to which the various ovens are adjusted, or the nature of the thermoplastic resin or of the carbon fill.

We claim:

1. A method of manufacturing of electrically conductive large surface area thin plates such as bipolar plates for fuel cells of high conductivity with good mechanical properties formed of a thermoplastic material comprising a mixture of thermoplastic resin and carbon fill, using a two-screw mixer having a screw length of more than twenty times the screw diameter, said method comprising the steps of; continuously introducing thermoplastic resin into a first zone of a two-screw mixer and compacting and preheating said thermoplastic resin, passing said resin into a second zone and kneading and plastifying said thermoplastic resin, continuously inserting into a third zone of said two-screw mixture a particulate carbon fill, the fill constituting 30% to 50% by weight of the mixture and being dispersed in said third zone, the speed of rotation of said two-screw mixer lying in the range of between 150 to 250 RPM, the temperatures of said zones lying in the range of 165° C. to 300° C., and, removing the mixture via an outlet from an extrusion head to form said thin plates, and wherein a copolymer of propylene and ethylene is chosen as the thermoplastic resin and wherein a carbon black is chosen as the particulate carbon fill, said carbon black constituting 35% to 45% by weight.

2. A manufacturing method according to claim 1, wherein a fill of not more than 10% by weight carbon fibers is inserted at one of said zones.

3. A manufacturing method according to claim 1, wherein said two-screw mixer further includes a fourth zone following said third zone, and said method further comprises the step of degassing said mixture at a pressure lying in the range of atmospheric pressure to a few millibars at said fourth zone.

4. A manufacturing method according to claim 1 wherein the thermoplastic resin and carbon fill are continuously supplied via weighing dispensing machines guaranteeing an error of not more than ±1%.

* * * * *